UNITED STATES PATENT OFFICE.

WILHELM GRÜTTEFIEN, OF ELBERFELD, GERMANY, ASSIGNOR TO ALIEN PROPERTY CUSTODIAN.

TRIMETHYL-ACETYL-SALICYLIC-ACID COMPOUNDS.

1,338,297. Specification of Letters Patent. Patented Apr. 27, 1920.

No Drawing. Application filed June 27, 1919. Serial No. 307,215.

*To all whom it may concern:*

Be it known that I, WILHELM GRÜTTEFIEN, doctor of philosophy, chemist, a citizen of Germany, residing at Elberfeld, Germany, have invented new and useful Improvements in Trimethyl-Acetyl-Salicylic-Acid Compounds, of which the following is a specification.

The present invention concerns the production of the hitherto unknown trimethylacetylsalicylic acid compounds, *e. g.* trimethylacetylsalicylic acid, trimethylacetylcresotinic acid, having most probably the following general formula:

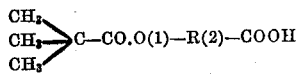

R stands for an arylen, *e. g.*

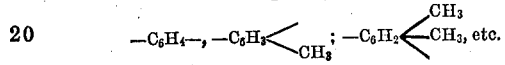

The new products are generally good crystallizing solid whitish compounds. They have proved to be valuable antirheumatics, analgetics and diuretics, an average dose being from ¼ to ½ gram. They are almost tasteless and form salts with metals *e. g.* with sodium, calcium and strontium. These salts retain the valuable therapeutic properties exhibited by the free acids.

A process for the production of my new products consists in reaction upon salicylic acid and its homologues with the acid chlorid of trimethylacetic acid:

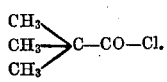

In order to illustrate the new process more fully the following example is given, the parts being by weight: 126 parts of trimethylacetyl chlorid are slowly added to a solution of 138 parts of salicylic acid in 200 parts of dry ether and 83 parts of pyridin, while the mixture is being shaken and cooled. It is then allowed to stand at ordinary temperature during 2 days while taking care to shake it from time to time. The oily product solidifies. Subsequently the ether is driven off, the residue is stirred up with water and the crystalline mass is filtered off and dried in the open air.

The new trimethylacetylsalicylic acid having most probably the following formula:

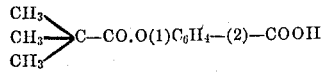

crystallizes from glacial acetic acid in the shape of white leaflets melting at 135° centigrade. Its alcoholic solution yields no violet coloration with ferric chlorid as the salicylic acid does. It is insoluble in water, soluble in alcohol and benzene.

The trimethylacetyl-meta-cresotinic acid obtained from trimethylacetyl chlorid and meta-cresotinic acid crystallizes from benzene in the shape of white leaflets melting at 160° centigrade. It is soluble in alcohol and ether, insoluble in water.

Its strontium salt can be obtained in the following way: A well powdered mixture of 44 parts of trimethylacetyl-meta-cresotinic acid with 26 parts of pure crystallized strontium hydroxid is stirred up with 500 parts of acetone. It is then allowed to stand a day while being shaken from time to time. Subsequently the white pulp of the strontium salt is filtered off, washed with acetone and dried in the open air. It is a white powder soluble in water.

I claim:—

1. The herein-described trimethylacetylsalicylic acid compounds having most probably the following general formula:

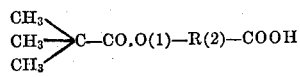

R stands for an arylen, *e. g.*

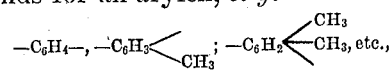

being generally crystallizing solid whitish compounds which have proved to be valuable antirheumatics, analgetics and diuretics; forming salts with metals which salts retain the valuable therapeutic properties exhibited by the free acids, substantially as described.

2. The herein-described trimethylacetyl-salicylic acid having in a free state most probably the following formula:

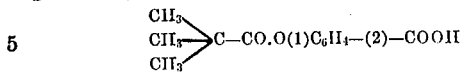

crystallizing from glacial acetic acid in the shape of white leaflets melting at 135° C; its alcoholic solution yielding no violet coloration with ferric chlorid; being soluble in alcohol and benzene; being a valuable antirheumatic, analgetic and diuretic; forming salts with metals, which salts retain the valuable therapeutic properties exhibited by the free acid, substantially as described.

In testimony whereof I have hereunto set my hand in the presence of two subscribing witnesses.

WILHELM GRÜTTEFIEN.

Witnesses:
EDUARD FERTIG,
WILHELM KREITKENBOHM.